United States Patent [19]

Meyers et al.

[11] Patent Number: 4,625,848

[45] Date of Patent: Dec. 2, 1986

[54] LOCK DEVICE

[76] Inventors: Pierre Meyers, Nimrodstrasse 7a, 8012 Ottobrunn; Klaus Meister, am Fischerwinkel 3, 8022 Grünwald, both of Fed. Rep. of Germany

[21] Appl. No.: 551,024

[22] Filed: Nov. 14, 1983

[30] Foreign Application Priority Data

Mar. 24, 1983 [DE] Fed. Rep. of Germany ....... 3310822
Oct. 24, 1983 [DE] Fed. Rep. of Germany ....... 3338604

[51] Int. Cl.[4] .............................................. F16D 23/12

[52] U.S. Cl. ............................... 192/93 A; 192/67 R; 70/282; 70/283; 292/142; 292/144; 292/199; 292/201

[58] Field of Search ............... 292/142, 144, 199, 201; 70/227, 278, 280–283, 279; 74/405; 192/0.02 R, 0.07, 93 A, 67 R

[56] References Cited

U.S. PATENT DOCUMENTS

| | | | |
|---|---|---|---|
| 1,283,825 | 11/1918 | Libby | 192/0.02 R |
| 1,954,822 | 4/1934 | Low | 192/0.02 R |
| 2,299,635 | 10/1942 | MacNeil et al. | 192/0.02 R |
| 2,311,321 | 2/1943 | Zigan | 192/0.02 R |
| 2,632,336 | 3/1953 | Luketa | 192/0.02 R |
| 3,038,386 | 6/1962 | Parske et al. | 192/0.02 R |
| 3,050,719 | 8/1962 | Ambrose | 192/0.02 R |
| 4,384,465 | 5/1983 | Muus | 70/129 |
| 4,416,127 | 11/1983 | Gomez-Olea Naveda | 70/278 X |
| 4,469,308 | 9/1984 | Nakamura et al. | 192/93 A X |

FOREIGN PATENT DOCUMENTS

| | | | |
|---|---|---|---|
| 2630019 | 1/1978 | Fed. Rep. of Germany . | |
| 3218112 | 11/1983 | Fed. Rep. of Germany . | |
| 3310822 | 10/1984 | Fed. Rep. of Germany . | |
| 3347896 | 7/1985 | Fed. Rep. of Germany . | |
| 16981 | of 1912 | United Kingdom | 192/93 A |

*Primary Examiner*—Robert L. Wolfe
*Assistant Examiner*—Lloyd A. Gall
*Attorney, Agent, or Firm*—Karl F. Ross; Herbert Dubno

[57] ABSTRACT

Electrically-controlled and manually-actuatable lock devices are provided which can be attached in a simple manner to doors of all types. Given remodeling of existing doors, the cylinder lock present in the respective door can remain. The lock device converts a rotational motion introduced at the outside of the door by the turning of a knob, the rotational motion being conducted to the inside of the door below the lock, into a rotational motion of a cam of a cylinder lock and thus allows a traditional lock to be opened and locked. The rotational motion initiated from the outside is connected to the lock cylinder with the assistance of an electromagnetic coupling device that, in turn, actuates a mechanical coupling device. The electromagnetic coupling device is essentially designed without an air gap. This particular provision enables its operation with very low electrical energy. The lock device can therefore be supplied with electrical energy from very small batteries for years.

7 Claims, 13 Drawing Figures

LOCK DEVICE

FIELD OF THE INVENTION

The present invention relates to an arrangement for operating lock devices by way of an electrical signal, given coincidence of an input key information with prescribed lock information, the electrical signal activating an electromagnetic coupling device that enables lock actuation, an externally accessible rotary portion being connected over the electromagnetic coupling device to a rotary portion executing the lock actuation, preferably in closure systems, particularly in detached dwellings and communal apartment buildings.

BACKGROUND OF THE INVENTION

It is already known from the German published application No. 26 30 019 to directly connect two coaxially disposed rotary parts of a lock to one another by way of an electromagnetic coupling device given coincidence of the input key information with the prescribed lock information.

The one part is accessible from the exterior and is designed as a rotary element which is rotatable by way of a handle inserted into a square opening. It comprises a first plate serving the purpose of closing and directly influencing a bolt and an electromagnet serving the purpose of opening and slaving a second plate directly influencing the bolt only when the electromagnet is excited, both as parts of the coupling device. Both the first plate and the coupling magnet can be turned together. In the one rotational sense, the first plate strikes an edge of the bolt by way of a projection and moves the bolt into the locked position. As a result of its shape, the first plate has no influence on the bolt in the other rotational sense, the bolt thus being incapable of being retracted. On the basis of the edges of an opening in the second plate, the second plate strikes a cog applied to the bolt and entrains the bolt in both directions insofar as a torque is applied to the second plate. This, however, is the case only when the electromagnet is excited.

In order to open the lock, it is therefore necessary that the magnetic connection between the electromagnet and the second plate has been produced. This connection must consequently exert the entire torque required for moving the bolt into the open position. This requires a strong electromagnetic field and, therefore, high electrical energy, in addition to a large format of the magnet.

The known arrangement, moreover, is susceptible to disruption, this being the reason that measures have been undertaken to enable opening even given outage of the electrical devices. The known arrangement, moreover, is very bulky and complicated.

For the above reasons, the known arrangement is mainly suitable only for larger vaults and the like. Its use is not meaningful in dwellings and portable containers and must also be foregone because of expense.

OBJECT OF THE INVENTION

The object of the present invention is to provide a simple arrangement that makes due with a low energy consumption and, while observing strict security requirements, can be universally employed, specifically being capable of later installment in door locks without the lock existing in the door requiring replacement.

SUMMARY OF THE INVENTION

The above object is achieved, according to the present invention, in that the externally accessible rotary part is torsionally connected, on the one hand, to driving a driving gear of a shift mechanism and, on the other hand, to the one part of the electromagnetic coupling device; in that the rotary part executing the lock actuation is torsionally connected to a take-off gear of the shift mechanism; and in that the other part of the electromagnetic coupling device is rigidly connected to a part which defines the position of the shift gear of the shift mechanism, this part moving the gear into engagement with the driving gear and with the take-off gear upon rotation of the externally accessible rotary part and an activated electromagnetic coupling device.

As a result of the above structure, it is possible to produce a torsional connection between the two rotary parts with low electrical energy, torques being applied from the exterior with sufficient strength being easily transmittable over the torsional connection. The electromagnetic coupling device need only then exert the torque with which the shift gear is brought from its idle position into the engaged position with the two drive gear wheels and must hold it there under given conditions insofar as measures are not undertaken for the continued retention of the shift gear in its engaged position without the assistance of the coupling device.

An extraordinarily space-saving format of the arrangement can be installed in an existing lock instead of the existing lock cylinder is enabled by the aforementioned structure wherein the driving gear and the take-off gear are disposed coaxially relative to one another and preferably exhibit the same diameter, the switch or shift gear is seated parallel to the axis of the driving and take-off gears on a pivoted lever seated coaxially thereto at a variable distance from its pivot axis that is defined by interaction between a slide carrying the shift gear and a guide track controlling its position, and that the pivoted lever facing away from the pivot axis carries the other part of the electromagnetic coupling device. Insofar as the shift gear does not exhibit two different diametrical pitches or, respectively, diameters relative to the driving and take-off gears, these likewise have the same diametrical pitch or, respectively, the same diameter with respect to one another. However, a graduation is also possible wherein the shift gear is designed as a so-called pinion. Since the shift gear is pivoted parallel to its axis, it can interact without difficulty with drive gears having different diametrical pitch or, respectively, different diameters.

Given such an arrangement, a determination of the initial positions of the individual parts before the activation of the electromagnetic coupling device and their resetting at the end of the actuation occurs in that the pivot lever and the slide are returned into their initial positions by way of springs as soon as the electromagnetic coupling device is deactivated.

According to another particular feature of the invention, the driving gear and the take-off gear are disposed coaxially relative to one another and have the same diameter, the shift gear is seated longitudinally displaceable on a shaft parallel to the axis and constantly meshes with the one drive gear, a pivot lever is seated coaxially with respect to the two drive gears and carries the other part of the electromagnetic coupling device at its end facing away from the pivot axis and displaces the shift gear along its shaft when it is pivoted such that the shift gear simultaneously meshes with the one driving gear and with the take-off gear. With this structure, a format is provided in which the shift gear is guided parallel to the axis at the required interval to the two drive gears and needs only to be displaced along its axis. In addition to the low force exertion this format produces a reliable interaction of the individual gears. A conversion of the rotary motion of the pivoted lever into a longitudinal displacement of the shift gear must thereby occur, but this can be implemented with relatively simple structure. The only thing subsequently required is the force with which the shift gear must be held in its displaced position, whereas forces or, moments no longer need be exerted for the engaged position of the gears.

A conversion of the aformentioned motions is possible in that the pivoted lever exhibits a cam surface which cooperates with the shift gear, the surface displacing the shift gear along its shaft given movement of the pivoted lever in each of the two rotational senses such that the shift gear simultaneously meshes the one driving gear with the take-off gear. The arrangement is activated in the same manner independently of the rotational sense, so that it can be employed in the same manner both for opening and for locking the lock.

As a result of providing the externally accessible rotary part with a gear that is torsionally connected to the one driving gear over a reversing gear, a format is provided by means of which the externally accessible rotary part is torsionally connected to the driving gear over a shaft which is disposed parallel to the axis and lying outside of the area of the existing lock. The shift gear can thereby lie against the driving gear or against the take-off gear when exerting influence on the lock as long as the electromagnet is not excited. The transmission of the rotary motion onto the driving gear and the one part of the coupling device connected torsionally thereto occurs over a fixed gearing in which an auxiliary gear disposed on the shaft torsionally connects the externally accessible rotary part to the driving gear of the shift mechanism over a drive-reversing gear such that the user is not aware of any difference in comparison to the previous actuation mode.

Applying the aforementioned format, a combination that interacts from the interior with the lock cylinder of a lock occurs wherein the take-off gear is torsionally connected from inside to the lock cylinder of a cylinder lock, and the lock cylinder is covered toward the exterior by means which is secured against being drilled open. Therefore, the lock cylinder need only be replaced and the arrangement installed. The existing lock may remain. The format of the arrangement cannot be recognized from the exterior, nor can its manner of operation be influenced, and even the application of force, which was always heretofore possible, is reliably avoided.

According to a particular feature of the invention, the take-off gear is releasably connected to a rotary part that is accessible from the inside, a cover plate accessible from the inside, which may be key-actuated, exhibits the connection of the take-off gear to the rotary part accessible from the inside in its mechanically lockable pivot position, and provides a simple operation to be carried out proceeding from the inside which, however, can be easily prevented as needed by way of decoupling the turning knob. The decoupling is mechanically protected such that unauthorized opening from the inside is impossible. Prevented in such a manner, for example, is that intruders break a possible glass inset in the door, reach through and open the door from the inside. Also prevented as a result thereof is that children open the door from the inside when the same is undesirable. According to another feature of the invention, an arrangement in which the coupling of the driving gear to the output shaft by way of a dog coaxially seated within the output shaft provides a particularly reliable and simple coupling of the output shaft to the driving gear and the problems arising given the peripheral coupling of the driving gear to the take-off gear by way of a shift gear are eliminated.

Any and all mechanical wear of the electromagnetic coupling device is avoided by providing that, after displacement of the pivoted lever into one of the two excursion positions, a retaining magnet is activated and holds the pivot lever and, therefore, the coupling elements such as the shift gear and the dog, in this position with sufficient reliability. The torques to be exerted from the outside of the door are limited to those torques required for opening or respectively, closing the lock.

A reliable and delay-free switching of the current from the electromagnetic coupling device to the retaining magnets is achieved by a very simple structure, including the just-mentioned structure, according to a feature of the invention wherein the flow of current through the retaining magnet interrupts the flow of current through the electromagnetic coupling device, or at least reduces it to a relatively slight value, and wherein the winding of the retaining magnet is switchable by switches connected in parallel to the winding of the electromagnetic coupling device as well as to one or more diodes connected in series with the winding of the electromagnetic coupling device, a drop resistor is connected in series with both windings and is dimensioned such that the current through the winding of the electromagnetic coupling device is reduced by a relatively low value upon connection of the winding of the retaining magnet.

A compact structure of the arrangement derives as a result of constructing the arrangement wherein the input shafts, the output shafts and the elements serving the electrically-controlled mechanical coupling of the two shafts to one another are disposed in a box that can be applied to the door from the inside, and as a result of the disposition, a rotary part extending to the lock from the exterior and from below can be mechanically coupled and uncoupled from the lock cylinder or a corresponding part of the lock, and the arrangement can thus be subsequently applied in a simple manner to the inside of doors or the like without the necessity of making alterations at the door.

BRIEF DESCRIPTION OF THE DRAWING

Other objects, features and advantages of the invention, its organization, construction and operation will be best understood from the following detailed description taken in conjunction with the accompanying drawing, in which:

FIGS. 1*a* and 1*b* illustrate the structure of a lock device having a gear extending parallel to the axis, in which FIG. 1*a* is a side view as viewed along the line 1*a*—1*a* of FIG. 1*b*, and FIG. 1*b* illustrates, in a plan view, the lock device as viewed along the section line 1*b*—1*b* of FIG. 1*a*;

FIG. 2 illustrates the structure of a block device having a shift gear displaceable along its axis and having offset driving and take-off shafts, in a first embodiment, in which

2*b* is a cross-sectional view taken along the section line 2*b*—2*b* of FIG. 2*c*.

FIG. 3*a* is a sectional view taken along the parting line 3*a*—3*a* of FIG. 3*b*, and FIG. 3*b* is a sectional view taken along the section line 3*b*—3*b* of FIG. 3*a;*

FIGS. 5*a*, 5*b* and 5*c* illustrate the installation of a lock device according to FIGS. 2*a*-2*e* or FIGS. 3*a*-3*b*, in a house door having a cylinder lock, in which FIG. 5*a* illustrates the assembly of the parts with respect to the door, FIG. 5*b* is a fragmentary sectional view of the lock cylinder as viewed along the line 5*b*—5*b* of FIG. 5*c*, and FIG. 5*c* is an end view of the lock cylinder of FIG. 5*b*.

SPECIFIC DESCRIPTION

Figure 1A:
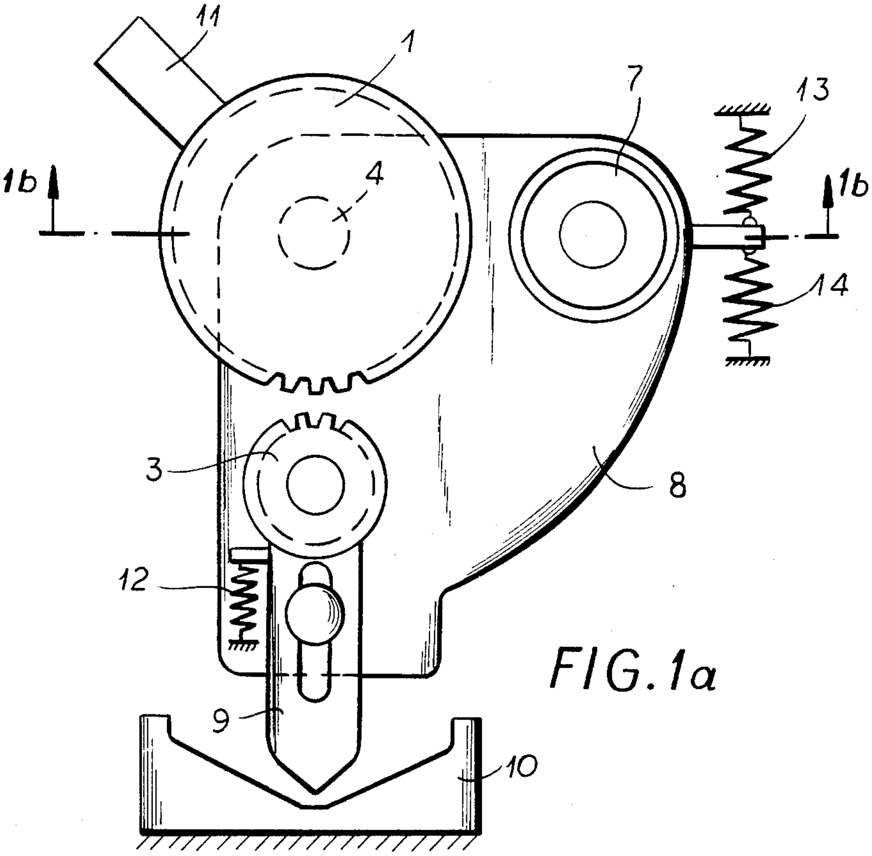
Figure 1B:
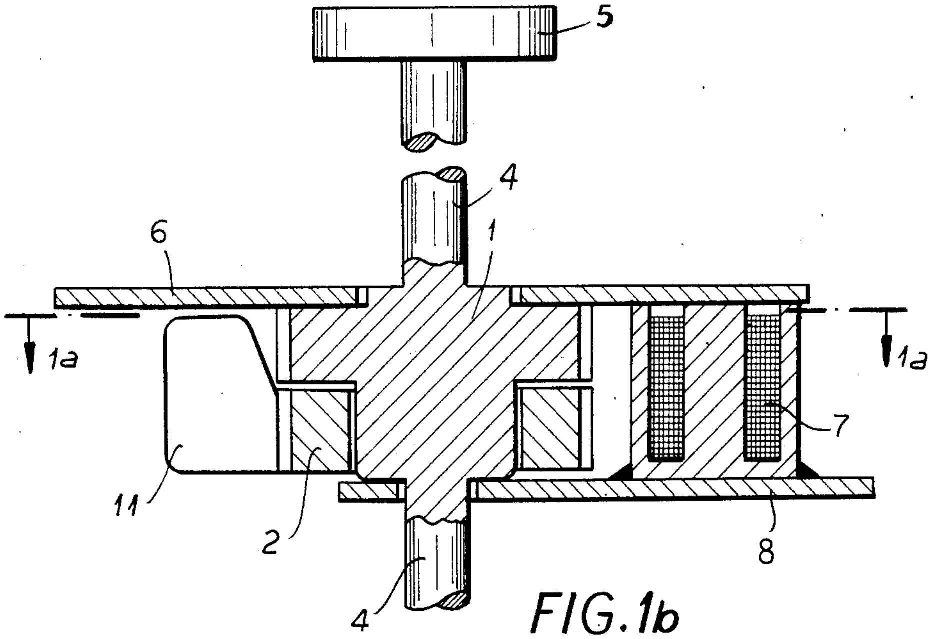
Figure 2A:
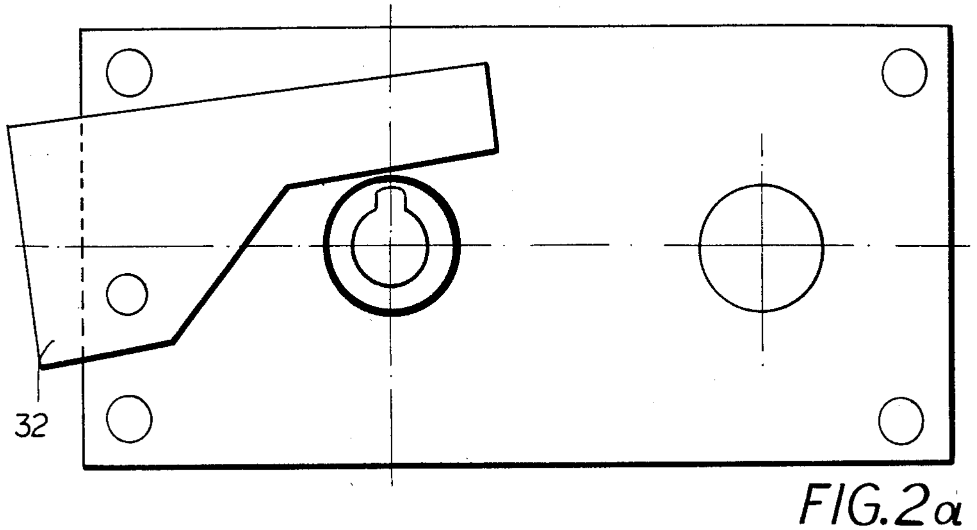
FIG. 2*a* is a rear view of the lock device, FIG.
Figure 2B:
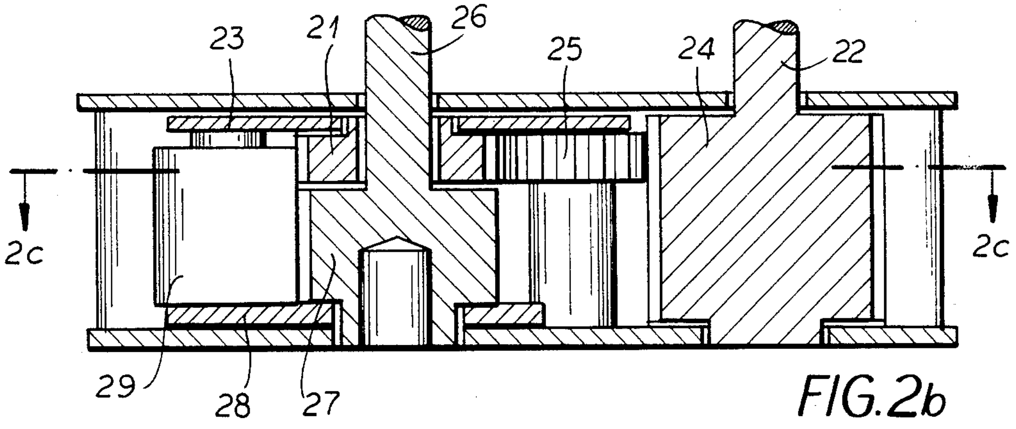
Figure 2C:
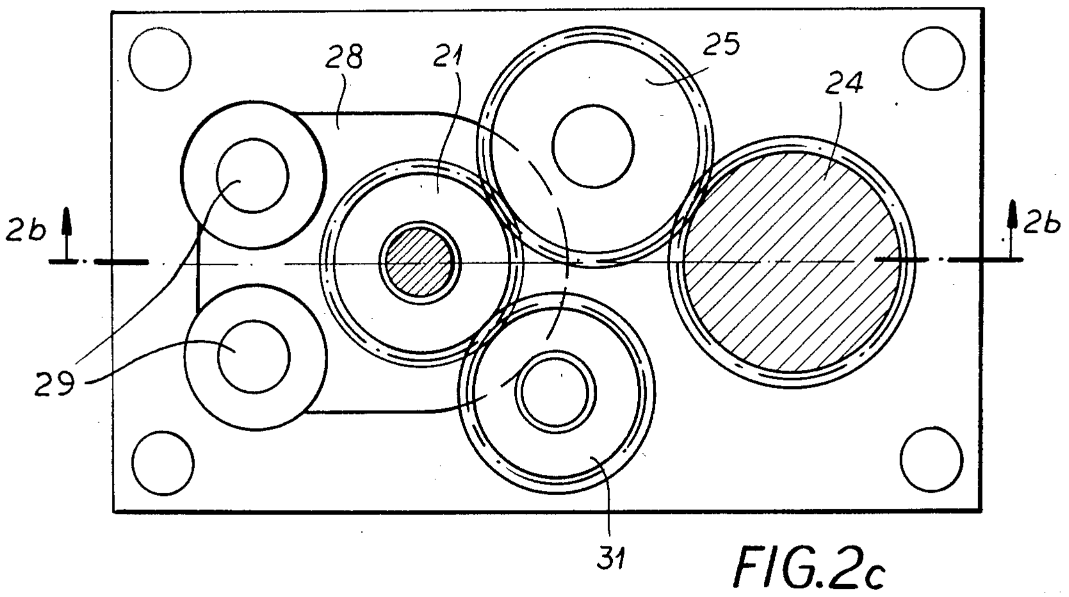
FIG. 2*c* is a sectional view of the arrangement taken along the sectional line 2*c*—2*c* of FIG. 2*b*.
Figure 2D:
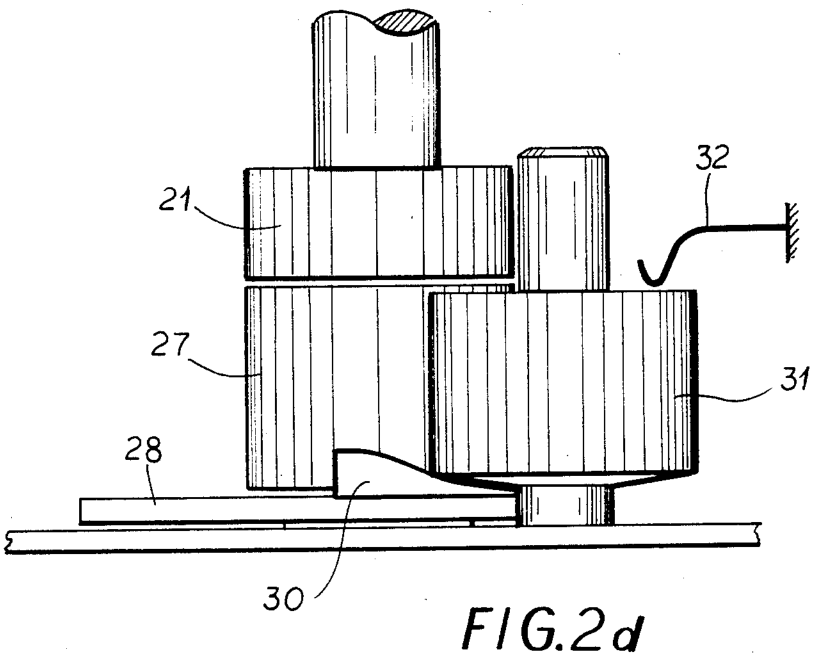
FIG. 2*d* illustrates the details of a pivoted lever having a curved cam surface and a shift gear guided thereby in an elevation view.
Figure 2E:
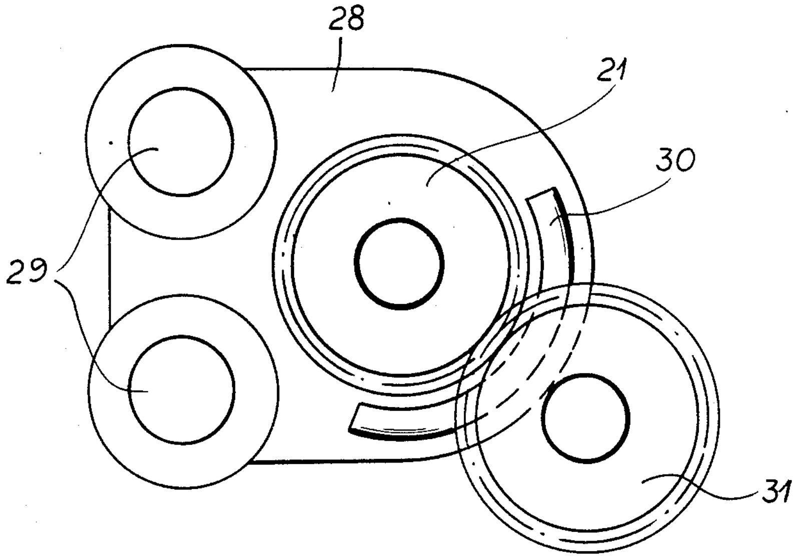
FIG. 2*e* is a plan view of the structure illustrated in FIG. 2*d;*

Referring to the embodiment of FIG. 1*a* and FIG. 1*b*, a driving gear 1 is torsionally connected to a shaft 4. A turning knob 5 and an armature plate 6 comprise low-retentivity material as one part of an electromagnetic coupling device, so that these elements can be turned in common by the knob 5 as an externally accessible part without the lock being influenced first.

The take-off gear 2 carries a cam 11 for executing the lock actuation and is coaxially seated freely rotatable on a driving gear 1. A pivot lever 8 is likewise coaxially seated freely rotatable on the shaft 4 projecting inwardly beyond the driving gear 1, the pivot lever 8 carrying an electromagnet, designed as a pot magnet in this exemplary embodiment, at an end spaced from the shaft 4 as its pivot axis, as the other part of the electromagnetic coupling device. The electromagnet 7 and the armature plate 6 are ground relative to one another such that the air gap between the two is largely zero, even in the non-excited condition of the magnet. The pivot lever 8 also carries a radially-displaceable slide 9 that is movable with its nose on a guide track 10 and sliding opposite the bias provided by a spring 12. The slide 9 carries the bearing for the freely rotatable shift gear 3 and, depending on the position of the guide track 10, places the gear 3 into or out of engagement with the driving gear 1 and with the take-off gear 2. The pivot lever 8 is retained in its initial position by a pair of springs 13, 14 or, respectively, is pivoted back into this initial position by these springs after the conclusion of an excursion.

Upon input of the correct key signal, a d.c. signal is formed, in a manner not illustrated, the d.c. signal exciting the electromagnet 7 which forcefully attracts the plate 6. When the armature plate 6 is now turned with the assistance of the turning knob 5, the armature plate 6 entrains the electromagnet and, therefore, the pivot lever 8 rotates freely until it strikes a mechanical pivot limitation (not shown in detail).

Induced by the rotation of the pivot lever 8, the slide 9 slides on the guide track 10 and moves the shift gear 3 radially inwardly towards the shaft 4 until the shift gear 3 simultaneously engages the driving gear 1 and the take-off gear 2. The gears are now torsionally connected to one another so that continued rotation of the turning knob 5 effects a transmission of this rotational motion from the driving gear 1 over the shift gear 3 onto the take-off gear 2 and, therefore, onto the cam 11 connected thereto. The cam 11 actuates the lock, whereby it advances or retracts a bolt and thus opens or locks the lock depending on the sense of rotation.

A slip thereby occurs between the armature plate 6 and the electromagnet 7 which likewise admits the slip due to the execution selected, but which increases the torque to be exerted over the turning knob 5 by the moment of friction of the magnetic coupling. In order to avoid this slip or, respectively, the mechanical losses and wear between the electromagnet 7 and the armature plate 6 connected thereto, an electrically cancelable lock-in (not illustrated in detail here) of the pivoted lever 8 or, respectively, of the slide 9 in the pivoted position that has been assumed can occur, enabling the electromagnet 7 to be disconnected from the power source and, therefore, cancelling the attractive force between the electromagnet 7 and the armature plate 6.

Given the exemplary embodiment of the invention illustrated in FIGS. 2*a*-2*e*, a construction is shown which, differing from that of the device of FIG. 1, allows a multi-turn displacement of the safety bolt of a lock. In this exemplary embodiment, the driving gear 21 is again torsionally connected to a shaft 22 which forms the input shaft and to an armature plate 23 of low-retentivity material as the one part of the electromagnet coupling device.

A shaft 22 carries a turning knob (not shown) and is torsionally connected to an auxiliary driving gear 24 which transmits its rotational motion over a drive-reversing gear 25 onto the driving gear 21 and, therefore, onto the armature plate 23 which is torsionally connected thereto. The driving gear 21 and the plate 23 are seated freely rotatable on a shaft 26 which forms the output shaft so that these parts can be turned over a turning knob located at the outside of the door without influencing the lock at first, being turned as a part accessible from the outside. The take-off gear 27 is rotatably connected to the shaft 26 and is coaxially seated freely rotatable within the driving gear 21. Likewise coaxial thereto, a pivot lever 28 is seated freely rotatable on the take-off gear 27, the pivot lever 28 carrying a pair of electromagnets 29 as the other part of the electromagnetic coupling device, at an end spaced from the take-off gear 27 which defines the pivot axis. In this exemplary embodiment of the invention, the electromagnets 29 are shown as U-shaped magnets whose magnetic lines of force flow from one leg of the magnet over the pivot lever 28 of low-retentivity material to the other leg of the magnet and which are closed by way of an armature plate 23.

The armature plate 23 is emplaced on the driving gear 21 movable to a slight degree and is ground to the magnet 29 such that the air gap between the magnet 29 and the armature plate 23 is largely zero, even in the non-excited condition of the magnet 29.

In addition to the magnet 29, the pivot lever 28 also carries a guide track 30 (FIG. 2*d* and 2*e*) which influences the shift gear 31 in both pivot directions of the pivot lever 28 such that the shift gear 31 is displaced axially against the bias of a spring 32. The shift gear 31 is seated freely rotatable and longitudinally displaceable parallel to the axis of the gears 21 and 27 and constantly meshes with the take-off gear 27 in this case. Upon input of the correct key signal, a d.c. signal is formed in a manner not illustrated here, the d.c. signal exciting the electromagnets 29 which, in turn, forcefully attract the armature plate 23.

When the armature plate 23 is now turned with the assistance of the input shaft 22, it entrains the electromagnets 29 and, therefore, the pivot lever 28 substantially slip-free up to detents (not illustrated) for the pivot lever 28. The guide track 30 influences the shift gear 31 and axially displaces the same until it simultaneously meshes with the driving gear 21 and with the take-off gear 27. The gears are now torsionally connected to one another so that continued turning of the input shaft 22 effects a transmission of this rotary motion onto the output shaft 26.

The output shaft 26 is, in turn, provided with a cam or acts upon a lock cylinder, whereby a bolt is advanced or retracted on a multi-turn basis and the lock thus opens or locks depending on the sense of rotation. A slip between the magnet 29 and the armature plate 23, which the arrangement allows, thereby occurs.

In order to avoid the slip and the mechanical losses and wear connected therewith, a lock-in of the pivot lever 28 or, respectively, of the shift gear 31 in the pivot position that has been assumed can occur in a manner not illustrated, this enabling the electromagnet to be disconnected from the power source and thus canceling the attractive forces between the magnets 29 and the armature plate 23.

With the exemplary embodiment of the invention illustrated in FIG. 3, a construction is shown in which the magnet can be deenergized after excursion by employing an electrically-disconnectable lock-in for the pivot lever and wherein the coupling of an input shaft to an output shaft is undertaken coaxially within the output shaft.

In this embodiment of the invention, an input shaft 40 is torsionally attached to a driving gear 43 with a gear 41 and an interposed reversing gear 42. A armature plate 44 of low-retentivity material is torsionally connected to the driving gear 43, but movable to a certain degree. The driving gear 43 is coaxially and freely rotatably seated on an output shaft 45. A pivot lever 46 carries two magnets 47 and 48 and is likewise coaxially seated on the output shaft 45.

In this construction of the invention, the magnets 47 and 48 are designed as U-shaped and carry windings 49 and 50. As in the previous embodiments, the magnets are ground relative to the armature plate 44 and the armature plate 51 which close the magnetic circuit such that the air gaps are substantially zero.

With rotation of the input shaft 40 and, induced thereby, of the plate 44, the pivot lever 46 is pivoted out so far given an excited magnet 47 until the lever 46 actuates, depending on the sense of rotation, an electrical contact 52 or an electrical contact 53. Upon actuation of a contact, the current through the magnet 47 is switched to the magnet 48 which now enters into a friction-type lock with an armature plate 51 stationarily mounted relative to the housing and thus retains the pivoted lever 46 in the selected pivot position of the two available pivot positions.

In addition to the magnets 47 and 48, the pivot lever 46 carries guide tracks 54, 55 over which, upon excursion of the pivot lever 46, a rotationally-fixed plate 56 that is seated coaxially relative to the output shaft 45 is cammed and displaced axially upwardly. The actual displacement of the plate 56 effects an axial displacement of a dog 57 torsionally seated in the outprt shaft 45 relative to a spring 58 to such a degree that it fully engages in a groove of the driving gear 43.

Consequently, the output shaft is torsionally attached to the driving gear 43 and, therefore, the input shaft 40 over the reversing gear 42. The rotation of the input shaft and the enabling of the magnet 47 by a d.c. signal required with the assistance of a correct key input therefore effects an excursion of the pivot lever 46, thus a transfer of the current to the magnet 48, simultaneously effecting a mechanical coupling of the input shaft 40 to the output shaft 45, whereupon the armature plate 44 can be further turned force-free relative to the magnet 47.

The output shaft is, in turn, provided with a cam or acts directly upon a lock cylinder, whereby a bolt is advanced or retracted on a multi-turn basis and, therefore, the lock opens or locks depending on the sense of rotation.

Figure 3A:
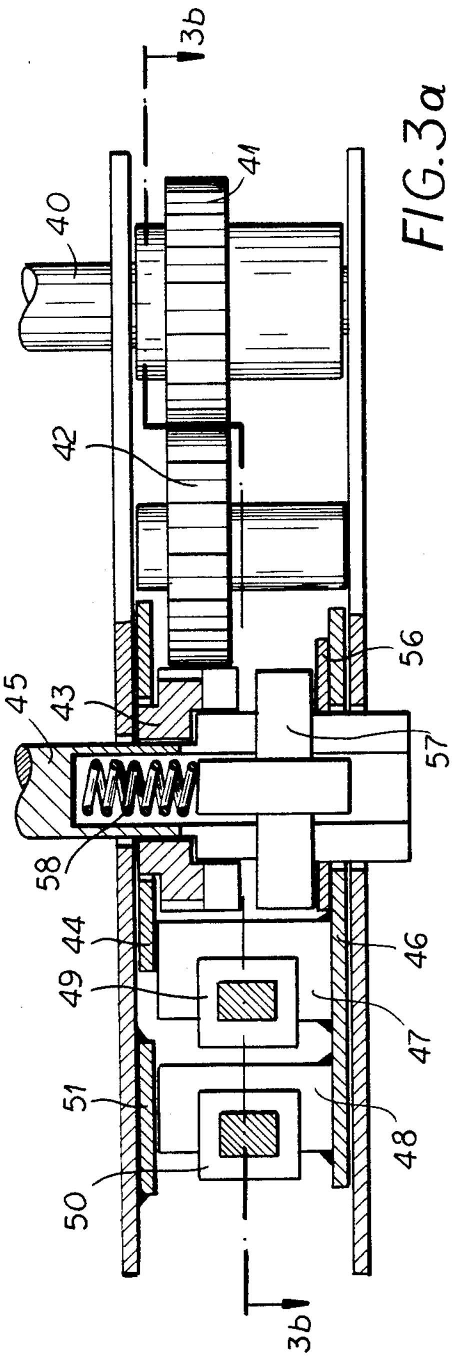
FIGS. 3*a* and 3*b* illustrate the structure of a lock device having offset driving and take-off gears and a coupling of the take-off shaft to the driving gear by way of a dog, the coupling being placed coaxially in the take-off shaft, whereby
Figure 3B:
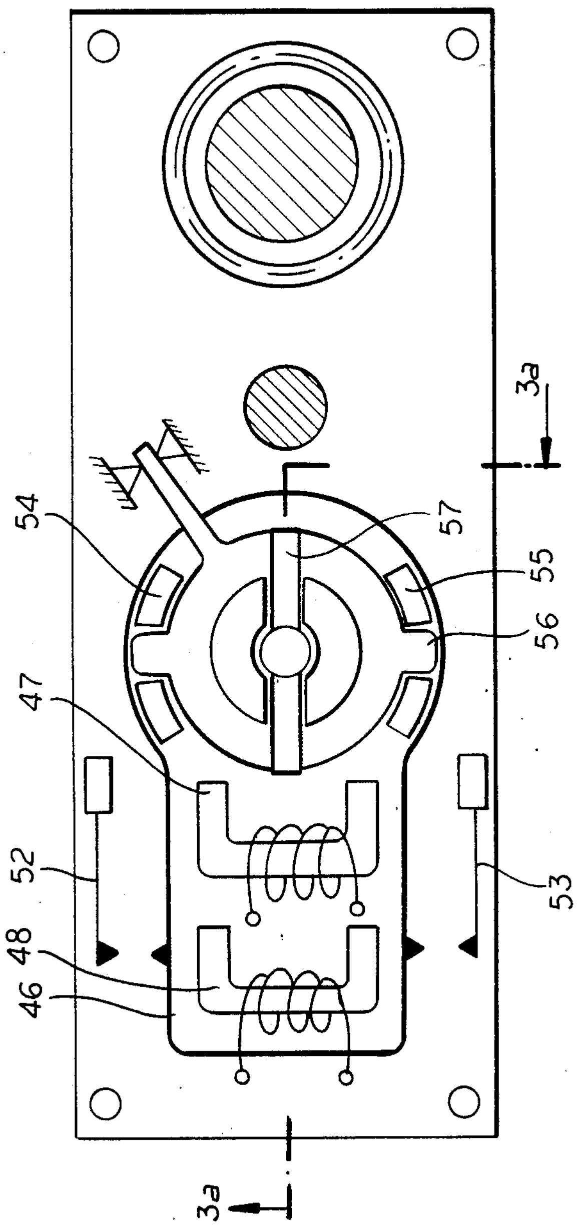
Figure 4:
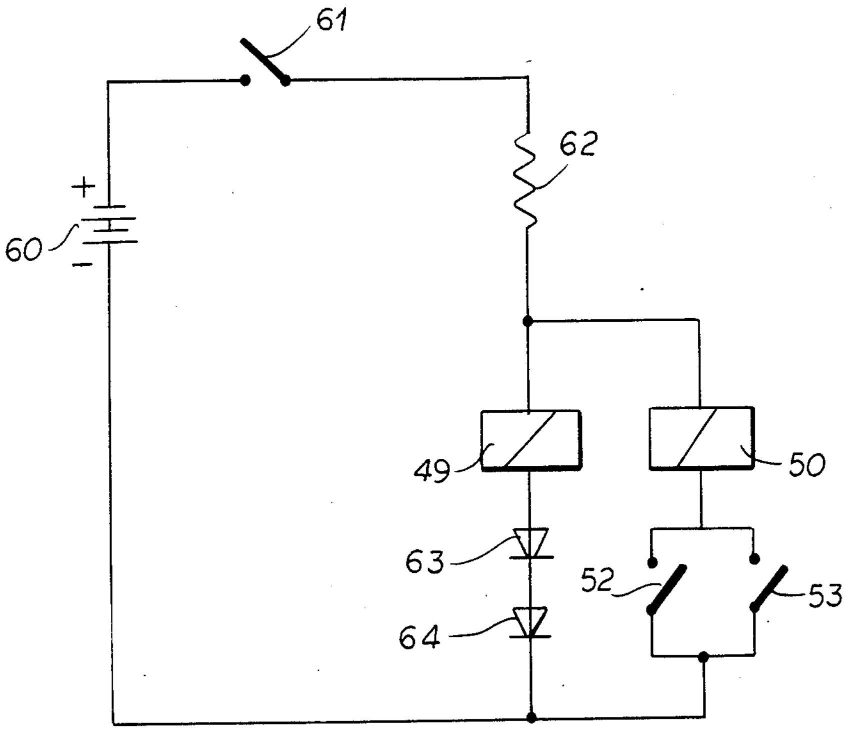
FIG. 4 is an electrical circuit diagram of the embodiment illustrated in FIG. 3.

FIG. 4 illustrates the circuit for the excitation of the magnets 47 and 48 of FIG. 3*a* and FIG. 3*b*. The electrical signal acquired by inputting the correct key signal closes a switch 61 to connect a d.c. voltage source to the coil 49 of the magnet 47. Connected in series with the coil 49 are a drop resistor 62 and one or more diodes 63, 64 poled in the forward direction or similar elements that exhibit a threshold voltage.

Upon excursion of the pivot lever 46 of FIG. 3*a* and FIG. 3*b*, either the switch 52 or the switch 53 is closed, depending on the direction of rotation. The current then flows through the coil 50 of the magnet 48 when one of the switches closes. As a result of selective dimensioning of the drop resistor 62 in conjunction with the resistance of the coils 49 and 50, the current in the coil 49 decreases to very low values given current flow through the coil 50, induced by the threshold voltage of the diodes 63 and 64. A delay-free transfer of the current from the one magnet to the other is achieved in a very reliable fashion with very simple structure in this manner. In order to switch the device back, the current flow is interrupted by the switch 61.

Figure 5A:
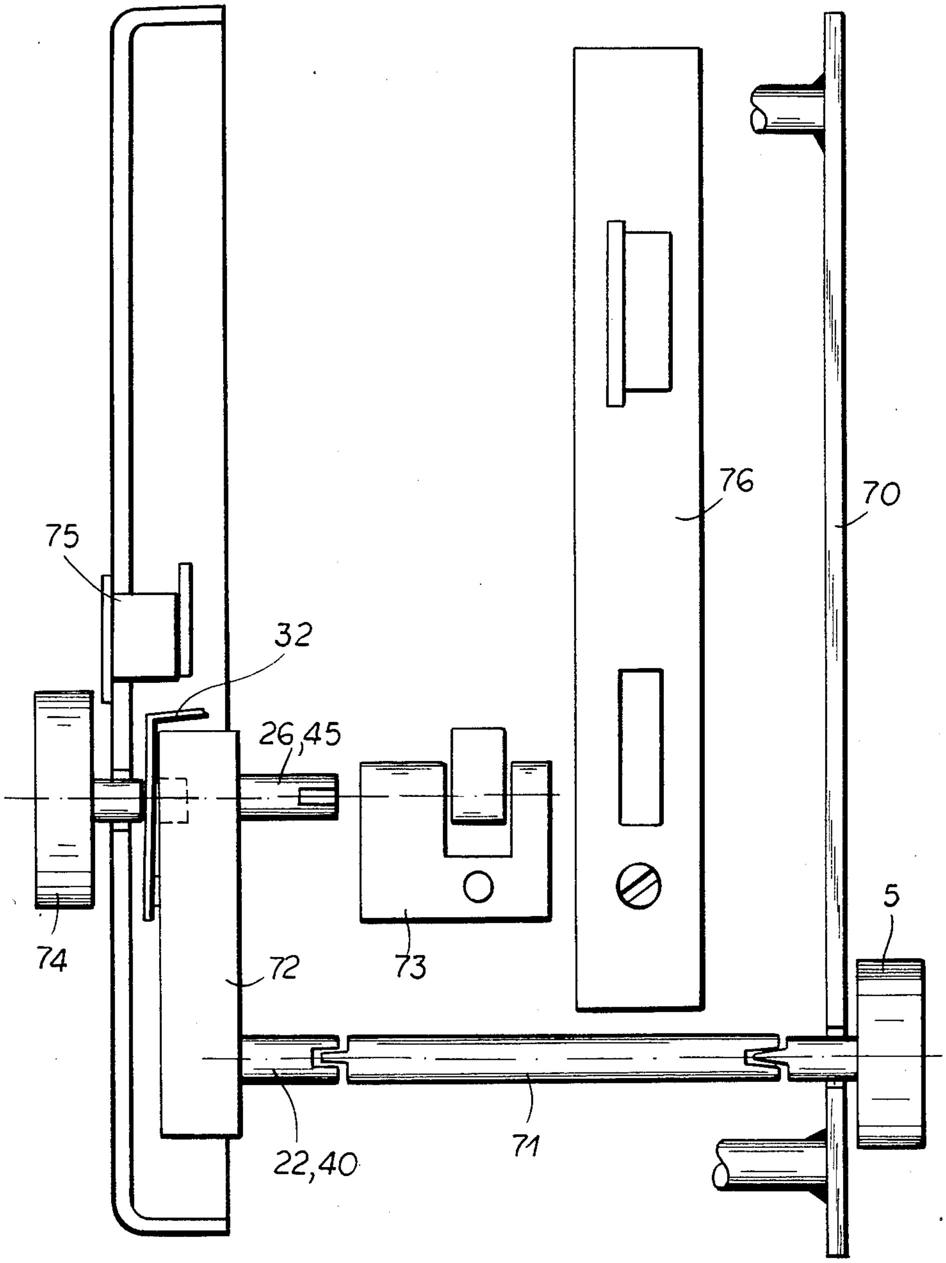

Given the lock device illustrated in general in FIG. 5*a* with a lock cylinder and a coupling device having offset axes, as illustrated in FIGS. 2*a*–2*e* and FIGS. 3*a*–3*b*, the entire lock area critical to security is covered from the outside by a steel plate 70 in a manner secure against intrusion and is fastened to the door from the inside. The input shaft 22 or, respectively, 40 is torsionally tied to a turning knob 5 through a small opening in the lower portion of the steel plate 70. A central portion 71 can have arbitrarily graduated lengths so that the arrangement can be easily matched to different door thicknesses.

A coupling device 72 (not illustrated in detail) here transmits every rotary motion of the turning knob to the driving gear in the same direction in the manner already described, and the driving gear rotates with free mobility given the lack of a current feed to the electromagnet. Given current feed to the electromagnet, a commensurate rotary motion of the output shaft 26, or respectively, 45 is effected in the manner described above, this actuating the lock cylinder 73.

The output shaft 26 or, respectively, 45, however, is also accessible from the inside of the door, where it is releasably connected to a turning knob 74 so that the lock can be manually locked without the collaboration of the coupling device 72. The turning knob 74 can be withdrawn in a defined path, whereby the connection of the turning knob 74 to the shaft 26 or, respectively 45 is interrupted.

Given a withdrawn turning knob 74, a armature plate 32, as illustrated in FIG. *2a*, can be pivoted between the turning knob's previous location and the output shaft 26 or, respectively, 45 by way of a key-actuated lock 75 such that a mechanical connection of the turning knob to the shaft 26 or, respectively, 45 is no longer possible. Thus, the actuation of the lock 76 from the inside of the door can be suppressed, without influencing the actuation of the lock from outside of the door.

Figure 5B:
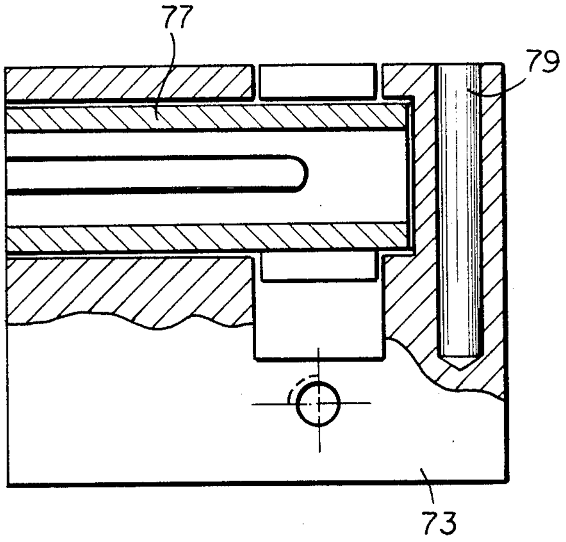

The lock cylinder 73 effects the displacement of a safety bolt in the lock 76 in a known manner. Inside, as illustrated in FIG. 5*b*, the lock cylinder 73 comprises a hollow shaft 77 which is provided with a dog channel to which a cam 78 is rigidly connected. Depending on the thickness of the door, the output shaft 26 or, respectively, 45 projects into the hollow shaft 77 to different depths and transmits its rotary motions onto the hollow shaft and over the cam 78. Adaptation to various door thicknesses is also provided here by the oblong design of the dog channel.

Figure 5C:
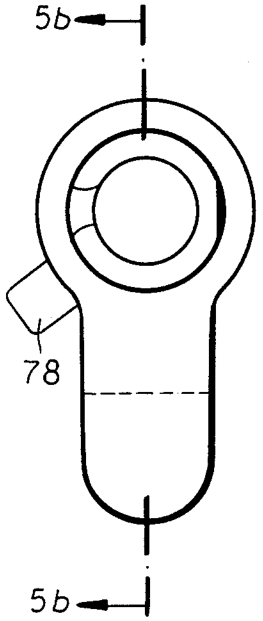

The aforementioned measures are illustrated in detail in FIG. 5*b* and FIG. 5*c*.

The exterior of the lock cylinder 73 is closed here and is protected in a burglar-proof manner against being drilled open by way of a steel pin 79, whereas the hollow shaft discharges from the inside into the lock cylinder 73.

Here, the arrangement is designed as a profiled cylinder without being restricted thereto. Round cylinders, oval cylinders or other cylinder shapes can be employed within the scope of the present invention.

Further, the invention is not limited to the exemplary embodiments that have been illustrated and described and can be advantageously employed anywhere that a lock device is to be manually actuated on the basis of an electrical signal.

Although we have described our invention by reference to particular illustrative embodiments thereof, many other changes and modifications may become apparent to those skilled in the art without departing from the spirit and scope of the invention. We therefore intend to include within the patent warranted hereon all such changes and modifications as may reasonably and properly be included within the scope of our contribution to the art.

We claim:

1. A drive for a lock arrangement comprising:

an input shaft mounted for rotation;

an output shaft mounted for rotation;

an output gear rotationally coupled to said input shaft and mounted for free rotation about said output shaft;

a pivotal plate;

electromagnetic coupling means including an electromagnet carried on said pivotal plate and an armature plate, said armature plate being mounted for rotation with said output gear;

excitation means for energizing said electromagnet and coupling said pivotal plate to said input shaft via said armature plate and said output gear;

cam means on said pivotal plate;

said output shaft including a bore and a transverse slot through said bore;

said output gear including a groove;

dog means comprising a spring in said bore, a member slidable within said bore and biased by said spring and a dog carried on said member slidable in said slot and engaged and cammed by said cam means to move into said groove and couple said output shaft to said input shaft via said output gear.

2. The drive defined in claim 1, wherein:

said electromagnet is a first electromagnet and said armature plate is a first armature plate;

and said electromagnetic coupling means further comprises a second electromagnet carried on said pivotal plate and a fixedly mounted second armature plate;

said excitation means comprises transfer means operable in response to a predetermined amount of pivoting of said pivotal plate to transfer excitation from said first electromagnet to said second electromagnet so that said pivotal plate is retained in its pivotal position via its magnetic attraction via said second electromagnet to said second armature plate and said first armature plate becomes free to rotate with said output gear.

3. The drive defined in claim 2 wherein:

said excitation means and said transfer means comprise a source of current, a key-operated switch operable to connect said source of current to said first and second electromagnets, a pair of switches connected in parallel with each other and in series with said second electromagnet and respectively operable by said pivotal plate in respective directions of pivoting to connect said second electromagnet in circuit with said current source, and voltage drop means connected in series with said first electromagnet and effective upon operation of either of said switches to cause sufficient deenergization of said first electromagnet to free said first armature plate for rotation.

4. The drive defined in claim 1 wherein said electromaget and said armature plate are ground to provide an essentially zero air space therebetween.

5. The drive defined in claim 2, further comprising spring means biasing said pivotal plate away from said second armature plate and for returning said pivotal plate to an initial position upon the energization of said second electromagnet.

6. The drive defined in claim 1, further comprising a further rotary member accessible from the inside of a closure panel and releasably coupled to said output shaft for inside manual operation.

7. A drive for an arrangement for a closure, which includes a closure panel having an exterior side and an interior side comprising:

an externally accessible first rotary member coupled to an input shaft;

an output second rotary member for executing lock actuation and coupled to an output shaft;

an output gear rotationally coupled to said input shaft and mounted for free rotation about said output shaft;

a pivotal plate;

electromagnetic coupling means including an electromagnet carried on said pivotal plate and an armature plate, said armature plate being mounted for rotation with said output gear;

excitation means for energizing said electromagnet and coupling said pivotal plate to said input shaft via said armature plate and said output gear;

cam means on said pivotal plate;

said output shaft including a bore and a transverse slot through said bore;

said output gear including a groove;

dog means comprising a spring in said bore, a member slidable within said bore and biased by said spring and a dog carried on said member slidable in said slot and engaged and cammed by said cam means to move into said groove and couple said output shaft to said input shaft via said output gear.

* * * * *